United States Patent
Bowerman

[11] 3,923,375
[45] Dec. 2, 1975

[54] WEDGE REFLECTOR FOR FIBER OPTIC BUNDLE

[75] Inventor: Edwin R. Bowerman, Topsfield, Mass.

[73] Assignee: GTE Laboratories Incorporated, Waltham, Mass.

[22] Filed: July 24, 1974

[21] Appl. No.: 491,592

[52] U.S. Cl. ............ 350/96 C; 350/96 B; 350/96 T
[51] Int. Cl.² .......................................... G02B 5/16
[58] Field of Search ...... 350/96 R, 96 B, 96 T, 96 C

[56] References Cited
UNITED STATES PATENTS

| | | | |
|---|---|---|---|
| 2,604,005 | 7/1952 | Hahn | 350/96 R X |
| 3,263,070 | 7/1966 | Hine | 350/96 R X |
| 3,433,940 | 3/1969 | Baez et al. | 350/96 R X |
| 3,583,795 | 6/1971 | Heine | 350/96 B X |
| 3,670,157 | 6/1972 | Bragg | 350/96 T X |
| 3,693,515 | 9/1972 | Baker | 350/96 T X |
| 3,832,028 | 8/1974 | Kapron | 350/96 R X |

Primary Examiner—David H. Rubin
Attorney, Agent, or Firm—Irving M. Kriegsman; Bernard L. Sweeney

[57] ABSTRACT

A wedge reflector is provided for increasing the intensity of the light in central portions of a normally conical output beam of light, such as from the fiber optic light guide by folding the outer portions of the beam back onto the central portion. The wedge reflector has a pair of divergent essentially planar reflective surfaces disposed on opposite sides of an entrance face which is adapted to fit against the termination end of the fiber optic light guide. The numerical aperture of the fiber optic light guide and the distance between the wedge reflector and the surface onto which the beam is to be directed determine the angle of divergence and the extent of the pair of divergent planar reflective surfaces.

4 Claims, 3 Drawing Figures

WEDGE REFLECTOR FOR FIBER OPTIC BUNDLE

BACKGROUND OF THE INVENTION

The present invention relates generally to wedge reflectors and is more particularly concerned with a novel wedge reflector for concentrating the light intensity in the central portions of a cone of light normally emitted by a source such as a fiber optic light guide.

Recently, fiber optics have been used in an increasingly wide range of applications for carrying light to positions remote from the actual light source. One difficulty which occurs as a result of the use of such a fiber optic light guide is that if the application requires that the light carried by the fiber optic light guide be projected from the end thereof onto a remote surface, the output from the light guide is in the form of a cone, the divergence of which is a function of the numerical aperture of the fiber optic light guide. Therefore, in many applications a great deal of the intensity of the light carried by the fiber optic light guide is wasted since it is not incident on the portions of the surface on which the light is desired. Typically, the problem is solved simply by increasing the intensity of the beam of light which is carried by the fiber optic light guide so that the intensity becomes sufficiently high in those portions of interest to accomplish the desired function.

In a copending patent application entitled "Industrial Automation Locating and Tracking System" by Finkel et al., Ser. No. 491,593, filed July 24, 1974 which is being filed concurrently filed herewith and is assigned to the same assignee as in the instant application, such a problem exists but it is undesirable to increase the intensity of the beam of light passing through the fiber optic light guide. The position sensitive photodetector which is preferred in the embodiment described is least sensitive near its center wherein in operation, the sensitivity is most critical. It is, therefore, desirable to increase the light intensity in the central portions of the beam without diminishing its lateral extent. This is desirable so that when the beam is incident on a moving target the full width of the beam is available for locating the target yet when the system is tracking the object, a maximum light intensity is incident on the center of the position sensitive photodetector.

SUMMARY OF THE INVENTION

Accordingly, it is an object of the present invention to provide a novel means for concentrating light energy received from a source such as a fiber optic light guide in a predetermined manner.

It is another object of the present invention to provide such a means which is simple in construction and which does not add to the complexity of the system in which it is used.

Accordingly, the present invention in its broadest aspect is a wedge reflector for increasing the intensity of light in central portions of a normally conical output beam of light from a light source, such as a fiber optic light guide, by folding the outer portions of the beam back onto the central portions. The wedge reflector has a pair of divergent, essentially planar surfaces and an entrance face adapted to receive the conical beam of light from the light source. The entrance face has a width essentially equal to that of the cone of light at the entrance face and forms equal angles with each of the pair of divergent, essentially planar surfaces. The entrance face intersects the pair of divergent, essentially planar surfaces along a pair of parallel lines. Finally, means are provided for positioning the wedge reflector so that the cone of light is incident on the side of the entrance face opposite to the pair of divergent, essentially planar reflective surfaces and bisecting the angle therebetween.

Further objects, advantages and features of the present invention will be apparent from the following detailed description of the preferred embodiments taken together with the accompanying drawing.

BRIEF DECRIPTION OF THE DRAWING

DETAILED DESCRIPTION OF THE PREFERRED EMBODIMENTS

Figure 1:
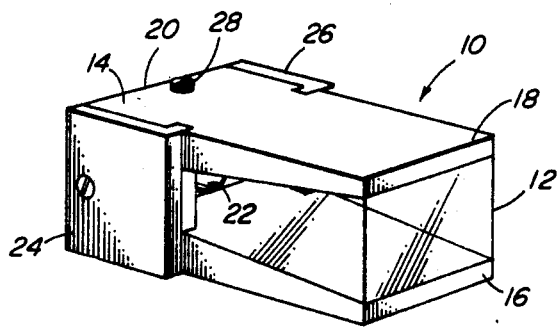
FIG. 1 is an isometric view of a wedge reflector according to the present invention utilizing a prism therein.

In referring to the various figures of the drawing hereinbelow, like reference numerals will be utilized to refer to identical parts of the apparatus.

Referring initially to FIG. 1, there is shown a wedge reflector 10 according to the present invention. The wedge reflector 10, in this embodiment, is comprised of a prism 12 and a prism holder 14. The prism holder 14 is a bifurcated member having arms 16 and 18 extending outwardly from a rear section 20. The rear section 20 has a bore 22 therethrough into which a fiber optic light guide may be placed in contact with the rear or entrance face of the prism 12. A means, such as a set screw 28, is provided in the holder 14 for retaining the fiber optic light guide in position against the rear or entrance face of the prism 12. The holder 14 also includes a pair of lateral locking members 24 and 26 removably attached to the rear portion 20 of the holder 14 for locking the prism 12 into position in the protective holder 14. The prism 12 is formed to fit snugly against the inner faces of the arms 14 and 16 against the front face of the rear wall 20.

Figure 2:
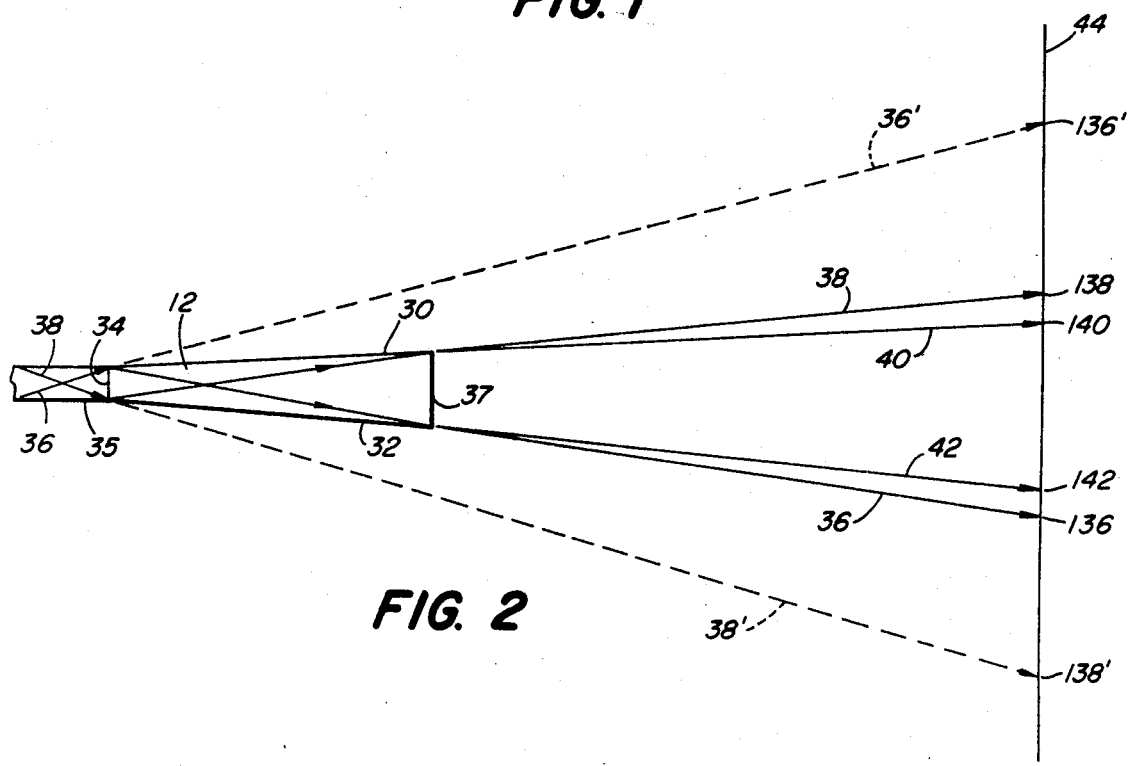
FIG. 2 is a schematic side view of the prism of FIG. 1 showing various ray paths within the prism which is useful in explaining the present invention.

Referring now to FIG. 2, the prism 12 has an upper face 30 and a lower face 32 which are divergent, essentially planar reflective surfaces. The reflectivity of the surfaces is achieved by applying a reflective metallic coating thereto since many rays are incident on the surface at greater than the critical angle. The prism 12 also has an entrance face 34 adapted to fit snugly against a light source, such as the termination end of a fiber optic light guide 35. The rays of light are emitted from the prism through an exit face 37 toward a remotely positioned object identified by the reference numeral 44. The entrance 34 is of essentially the same width as the end of the fiber optic light guide 35. The entrance face intersects the pair of divergent planar reflective surfaces 30 and 32 along a pair of parallel lines and forms approximately equal angles with each of the divergent planar reflective surfaces.

FIG. 2 also shows diagramatically the ray paths of several rays to illustrate the operation of the wedge reflector of the present invention. Rays 36 and 38 are shown initially propagating along the fiber optic light guide 35. This representation is not precisely accurate since the fiber optic light guide 35 is made up of a large number of individual fiber optic elements each of which has a portion of the light propagating therealong. However, for purposes of illustration, the representation in FIG. 2 is believed to be sufficiently accurate. Rays 36 and 38 are here shown to be the limiting cases for the fiber optic light guide 35. The divergence of these rays with respect to the axes of the fiber optic light guide 35 is determined by the relative refractive indicies of the core material and the cladding which comprises each of the fibers 35. The larger the difference between the refractive indicies, the larger the angle which the rays may make with a side wall of the fiber core without passing through the wall into the cladding and out of the fiber.

Where the wedge reflector prism 12 is not to be used, the rays 36 and 38 would exit from the fiber 35 along the dotted lines 36' and 38' thereby intersecting the object surface 44 at points 136' and 138' respectively. These rays defined the limits of the cone of light normally emitted by the fiber optic light guide 35. The center portion of the cone is filled by light rays traveling at smaller angles of divergence from the axis. However, when the wedge reflector prism 12 is emplaced against the end of the fiber optic light guide 35, the rays 36 and 38 are reflected by the reflective surfaces 30 and 32 respectively and exit from the exit face 37 of the wedge reflector prism 12. The rays travel to the object surface 44 where they intersect at points 136 and 138 respectively. Rays 40 and 42, which intersect the object surface 44 at points 140 and 142 respectively, correspond to those rays which travel directly along each of the reflective surfaces 30 and 32 but which are not reflected thereby.

Therefore, it can be seen that the portion of the cone of light normally emitted by the fiber optic light guide 35 which extends above the point 140 on the object 44, is now folded back upon itself so that the light intensity normally found in the portion above point 140 on the object surface 44 is now superimposed on the central portion of the cone between points 140 and 136. Similarly, the bottom portion of the cone of light existing below point 142 has been folded upwards over the central portion of the cone of light and exists now between points 142 and 138 on the object surface 44. In this manner, the intensity of the light incident on the object surface 44 in the central portions is thereby greatly increased and that percentage of the light which would normally be wasted as a result of the fringe areas of the cone of light is now utilized.

Although the foregoing description is limited to the use of reflective surfaces in order to fold the bundle of rays exiting from the fiber optic light guide in two directions, from the top and bottom back onto the central portions, it should be understood that it is included within the purview of the invention that the folding of the bundle of rays may occur only from one side of the bundle or it may occur from two, three, four or more sides depending upon the choice of the designer and the configuration desired for the output beam. It is, however, believed that the most reasonable configurations would utilize either one or two regularly disposed pairs of faces on the prism.

Figure 3:
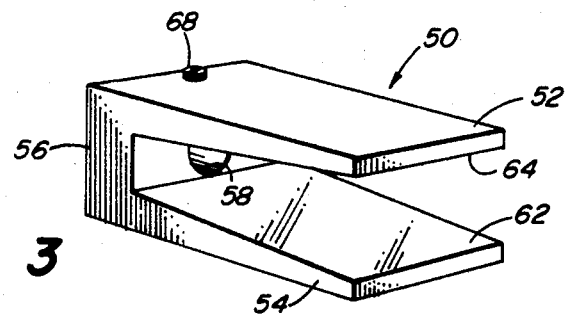
FIG. 3 is an isometric view of a second embodiment of the present invention.

FIG. 3 shows another embodiment of the present invention in which a pair of mirrors 62 and 64 are formed on the inner surfaces of the arms 52 and 54 of a bifurcated wedge reflector 50. Once again, a hole 58 is formed in the rear portion 56 of the reflector 50 and utilizes a holding means such as a set screw 60 for positioning a fiber optic light guide within the bore 58. The mirrors 62 and 64 in this embodiment perform the same functions as the faces 30 and 32 of the prism 12 in FIG. 1.

In each of the foregoing embodiments, the light source has been the termination end of a fiber optic light guide. However, the light source may be any generator of a conical output beam of light as well.

While there have been shown and described what are considered to be preferred embodiments of the present invention, it will be apparent to those of ordinary skill in the art that various changes and modifications may be made therein without departing from the spirit of the invention as defined in the appended claims.

I claim:

1. A wedge reflector for increasing the intensity of light in central portions of a normally truncated conical output beam of light from a fiber optic bundle, the wedge reflector comprising a holding member having an entrance portion through which a centrally located bore extends for slidably receiving the fiber optic bundle therein; the fiber optic bundle extending throughout the length of the bore and terminating at a first face of the holding member so that a normally truncated conical beam of light from the fiber optic bundle emanates from the first face of the holding member, means for securing the fiber optic bundle in the holding member, and a pair of divergent, essentially planar internally reflective surfaces affixed to the holding member, the reflective surfaces intersecting the first face on the holding member on opposite sides of the bore, at approximately identical angles, and along a pair of parallel lines which are separated by the width of the bore so that the axis of the truncated conical beam of light bisects the angle between the pair of divergent, essentially planar, internally reflective surfaces, the divergence of the reflective surfaces being selected so that outer portions of the normally truncated conical beam are folded back over substantially the full width of the central portions of the beam thereby increasing the intensity of the beam in the central portions thereof.

2. A wedge reflector according to claim 1, wherein the pair of divergent, essentially planar, internally reflective surfaces are faces of a prism, the prism also having an entrance face which abuts the fiber optic bundle at the first face on the holding member and an exit face parallel to the entrance face.

3. A wedge reflector according to claim 2, wherein the pair of divergent planar reflective surfaces are faces of the prism which have been coated with a reflective metallic material.

4. A wedge reflector according to claim 1, wherein the pair of divergent planar, internally reflective surfaces are a pair of mirrors affixed directly to the holding member.

* * * * *